United States Patent [19]
Ackley

[11] Patent Number: 5,360,653
[45] Date of Patent: Nov. 1, 1994

[54] ENCAPSULATED FOAM PAD

[76] Inventor: Robert E. Ackley, 8 Faversham Cir., Greenville, S.C. 29607

[21] Appl. No.: 993,841

[22] Filed: Dec. 21, 1992

[51] Int. Cl.⁵ .......................... B32B 3/04; B32B 1/04; E04B 9/00; E06B 3/54
[52] U.S. Cl. ......................... 428/71; 428/72; 428/122; 428/159; 428/192; 428/76; 428/167; 428/316.6; 52/309.4; 52/309.7; 52/309.8; 52/808; 52/809; 5/481
[58] Field of Search ................. 428/71, 72, 122, 159, 428/192, 316.6, 76, 167; 52/309.4, 309.7, 309.8, 808, 809; 5/481

[56] References Cited

U.S. PATENT DOCUMENTS

| | | | |
|---|---|---|---|
| 65,262 | 5/1867 | Ouroussoff | 5/420 |
| 2,738,834 | 3/1956 | Jaffe et al. | 155/182 |
| 3,242,508 | 3/1966 | Smithson | 5/334 |
| 3,273,180 | 9/1966 | Feinerman | 5/355 |
| 3,293,671 | 12/1966 | Griffin | 5/355 |
| 3,563,837 | 2/1971 | Smith et al. | 161/43 |
| 4,197,342 | 4/1980 | Bethe | 428/159 |
| 4,333,978 | 6/1982 | Kocher | 428/158 |
| 4,495,237 | 1/1985 | Patterson | 428/71 |
| 4,539,057 | 9/1985 | Ahlm | 156/212 |
| 4,603,445 | 8/1986 | Spann | 5/481 |
| 4,606,088 | 8/1986 | Michaelsen et al. | 5/434 |
| 4,843,666 | 7/1989 | Elesh et al. | 5/447 |
| 4,874,640 | 10/1989 | Donzis | 427/421 |
| 4,928,337 | 5/1990 | Chauncey | 5/465 |
| 5,158,821 | 10/1972 | Gebauer et al. | 428/175 |

Primary Examiner—George F. Lesmes
Assistant Examiner—Kathryne E. Shelborne
Attorney, Agent, or Firm—Henry S. Jaudon; Cort Flint

[57] ABSTRACT

A resilient panel comprising a first sheet having a plurality of pockets each having a resilient foam element located therein. Each of the foam elements is sized to substantially conform with the size of the pocket within which it is located. A second sheet is arranged over and attached to the first sheet so as to encapsulate the foam elements within the pockets in an uncompressed manner. This arrangement allows the panel to maintain a compression potential equal the entire compression range of the elastic elements. It also allows individual foam elements to be compressed without affecting adjacent foam elements.

23 Claims, 3 Drawing Sheets

ENCAPSULATED FOAM PAD

BACKGROUND OF THE INVENTION

This invention relates to an encapsulated foam pad which may be used with furniture, as a leisure mat or as a mattress surface.

Elastic mats are not in themselves novel as illustrated in U.S. Pat. No. 65,262 to Ouroussoff; U.S. Pat. No. 2,738,834 to Joffe, et al.; U.S. Pat. No. 3,242,508 to Smithson and U.S. Pat. No. 4,843,666 to Elesh, et al. The Ouroussoff patent shows a pad in which individual elements are united together along one edge of adjacent elements. The elements extend across the width of the pad. The Joffe, et al. patent shows a cushion in which upper and lower sheets are stitched together to form pockets which house resilient elements 24 and 26. The stitching compresses slightly the corners of the elastic elements which diminish its elastic capacity. The pockets are arranged transversely and longitudinally of the cushion and are of different sizes. In Smithson, the article is a quilt with diagonal pockets. The pockets are formed by stitching and the elastic material is housed in a compressed condition. The Elesh, et al. patent is similar to Ouroussoff, with pockets extending completely across the width of the pad. Each pocket may be individually formed and joined by Velcro TM. The pockets are formed to slightly compress the resilient material so that a portion of its elastic capability is lost.

It is an object of the instant invention to provide a resilient panel having compressible foam elements retaining their entire compression capacity.

It is an object of the invention to provide a resilient panel in which the individual resilient elements compress independently of each other.

It is another object of the invention to provide a resilient pad in which the individual resilient elements retain, after covering, their maximum deflection capability.

It is an object of the invention to provide individual pockets which house individual resilient foam elements and act to expand upon the resilient element being compressed and deformed.

Another object of the invention is to provide a resilient pad having pockets arranged in selected patterns.

Another object of the invention is to provide a resilient pad which in use functions without the hammock effect because each foam member compresses independently of the condition of adjacent foam members.

SUMMARY OF INVENTION

A resilient panel for use as a body support comprising a first flexible sheet, a second flexible sheet and a plurality of resilient foam elements. The foam elements are of selected first sizes and possess selected compression ranges. The first sheet is conformed to include a plurality of expandable pockets, which are arranged longitudinally and transversely of the panel. The pockets are formed of selected second sizes which substantially correspond with the selected first sizes. The pockets are formed with an open upper area defined by an edge. Each of said resilient elements is located within a respective one of the pockets with which it is of substantially conforming size so that the resilient elements remain in an uncompressed condition. The second sheet is secured to the first sheet along the edge so that the foam elements are encapsulated within pockets. The arrangement allows the resilient panel to retain the maximum elastic capability of the resilient elements.

The panel may be of rectangular configuration or other suitable configuration and the pockets may be of selected configuration and prescribed depth. The prescribed depth may be variable or uniform. The selected pocket configuration may be uniform or variable. Also, the selected compression range may be uniform or variable between the resilient elements. When variable, the resilient elements are arranged throughout the panel according to a selected pattern. The pattern may have the interior portion of the panel with resilient elements being more compression resistant than the resilient elements arranged along the exterior portion of the panel.

The resilient elements are sized to be accommodated within the selected size of the pockets. The resilient elements may be formed so that those elements of larger size also have a greater resistance to compression than other of the resilient elements.

The panel may be arranged with its interior portion containing the larger size resilient elements.

The pockets of the panel may be arranged diagonally transversely and longitudinally of the panel.

The first and second sheets utilized to form the panel are normally either knitted or woven of natural fibers. Alternatively, they may be formed of synthetic material. The first and second sheets may be joined by bonding or stitching. A resilient panel is formed by providing a first sheet of material with a plurality of pockets. Resilient elements of a size corresponding to that of the pockets are placed in the pockets. A second sheet is arranged over and attached to the first sheet so that the foam elements are encapsulated within the pockets in an uncompressed manner. This arrangement allows the panel to retain compression potential equal the entire compression range of the elastic foam elements. Also, the arrangement allows compression of individual elastic foam elements without affecting adjacent elastic foam elements.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
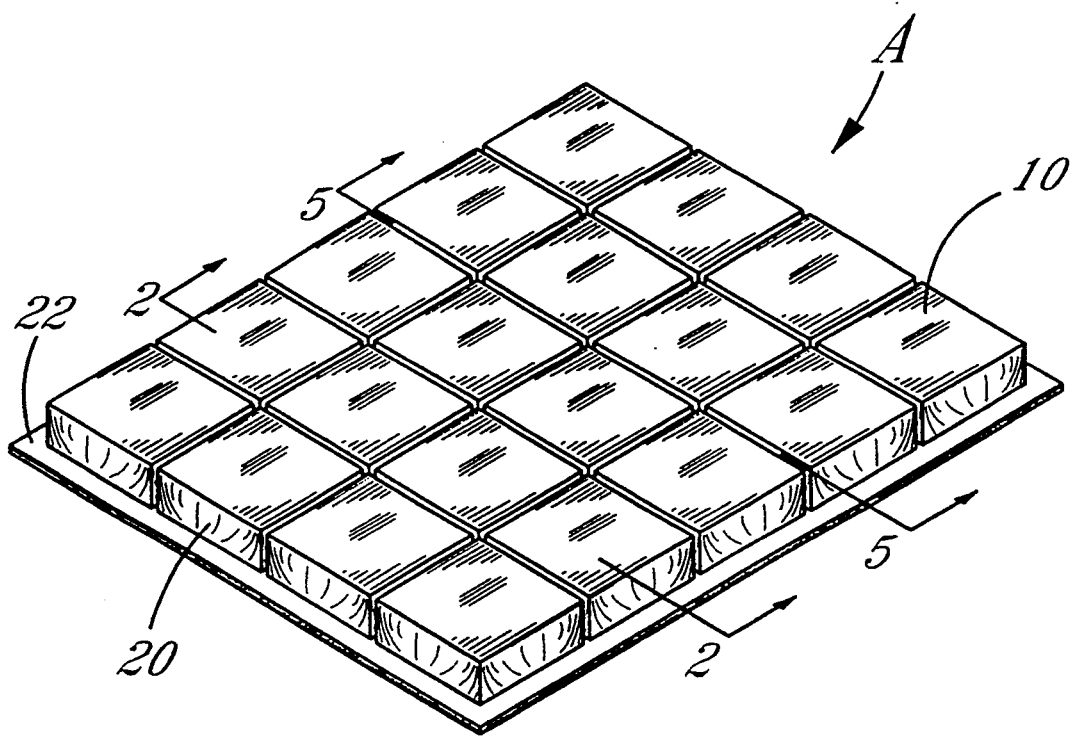
FIG. 1 is a perspective view of one embodiment of the resilient panel of the invention.
Figure 3:
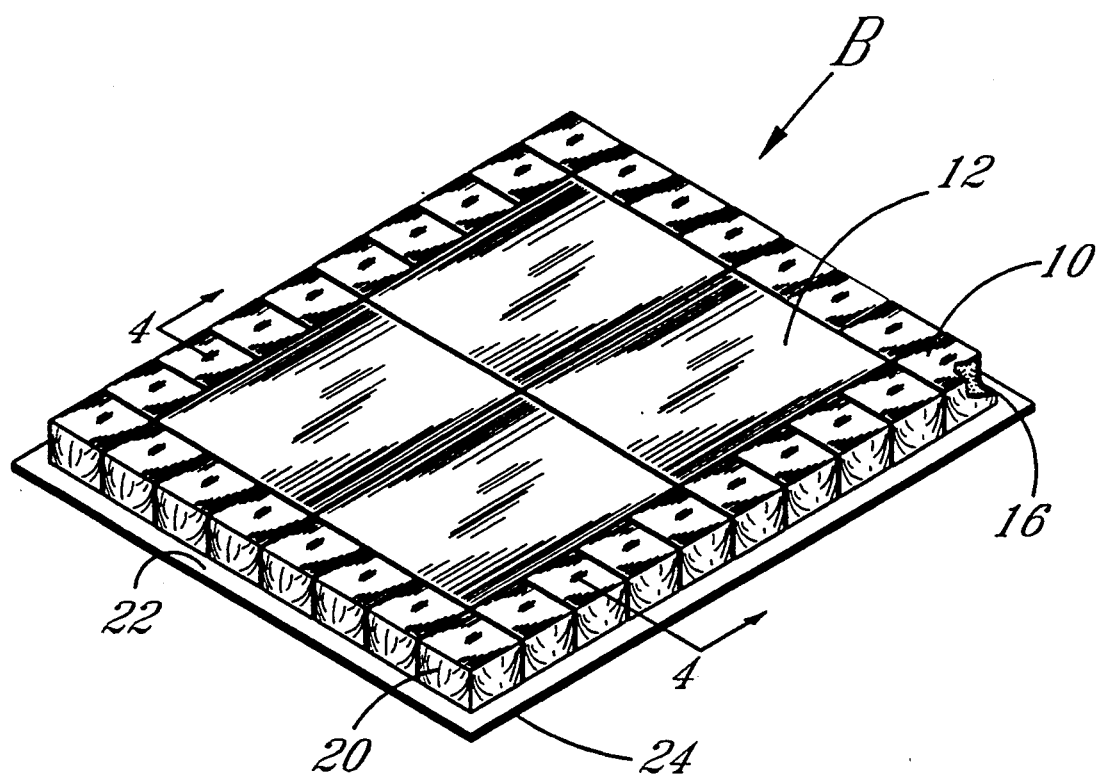
FIG. 3 is a perspective view of a second embodiment of the invention.
Figure 6:
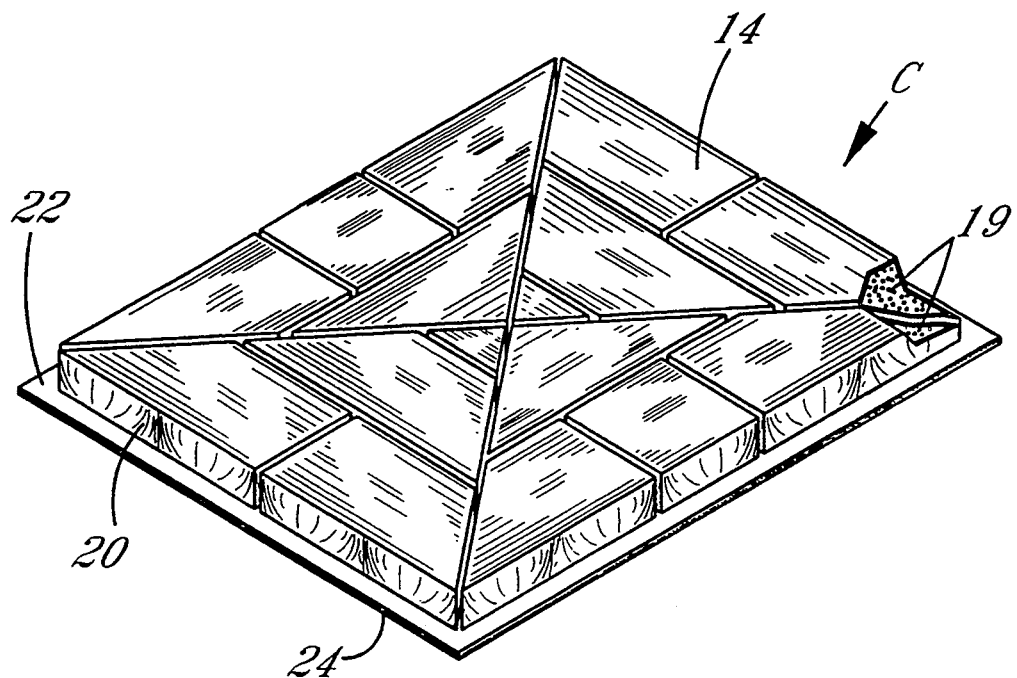
FIG. 6 is a perspective view of yet a third embodiment of the resilient panel of the invention.

The foam pad or resilient panel of the instant invention may be formed with the foam elements and the pockets formed by the covering fabric configured into various forms, such as pad A of FIG. 1, pad B of FIG. 3 and pad C of FIG. 6. While the outward appearance differs between the pads A, B & C, the structure of the pockets which encapsulate foam elements 16 and 18 is such as to apply no pre-stress or compression of the foam elements and thus allow the pad or panel to retain its entire resilient range prior to being compressed when in use. This retention of elastic capability is achieved by providing that the structure of each pocket 10, 12 and 14 is formed of a size slightly larger than the size of the occupying foam element and further that each pocket is formed with the ability to expand, such as by folds 20 formed about each pocket in upper covering fabric :22. The pockets are enclosed with lower cover fabric 24 being attached about the lower periphery of each pocket at 26. That the pockets have the ability to expand ensures that the foam elements are allowed total freedom to change shape while being compressed. The total freedom to change shape also ensures that the pressure required to compress the foam is not affected or altered by an outside force. This allows for more precise control of the cushioning effect.

The foam elements of the invention most preferably are formed of polyurethane foam of selected density. Other suitable synthetic foam materials or elastic material such as fill, loose foam particles, polyester, or fills exhibiting similar deflection characteristics may be used as desired. Deflection studies of elastic foam teach that such material possesses a non-linear deflection curve when compressed. These studies also reveal that foam offers its best support when compressed between twenty-five percent and fifty-five percent. Once the foam is compressed to sixty-five percent of its undeformed thickness it has bottomed out, i.e. it is no longer compressible and has lost its resiliency.

It is also known that when foam is compressed over long periods of time, such as in packaging or being encapsulated in products, it looses a portion of its elastic potential. This loss of elastic potential affects the uniformity of the cushioning effect and thus the performance of the article in which the elastic foam is being utilized.

Tests have also been conducted which teach that foam material encapsulated in a nonyielding area derives support from that area when compressed. Again, the uniformity and control of the cushioning effect is affected adversely.

These tests further show that sitting on a compliant cushion induces compression, shear, tension, and bending. As cushion deflection increases, so does the tension, shear and bending. Segmented cushions have been shown to decrease these forces on average 26% over the usable range of deflection compared to solid foam.

The test demonstrates that covers have a definite influence on the compression of foam cushions. Deflection results in increased surface tension of the cover, commonly referred to as "hammocking". A tight, non-stretch cover will affect the cushioning ability of the cushion since the cover limits the depth and shape of the body-cushion interface. Individually segmented cushions have been proven to decrease shear stresses. Hammocking increases surface shear thus negating the beneficial effects of a segmented cushion. Studies suggest that this hammocking effect increases with increased deflection.

Figure 2:
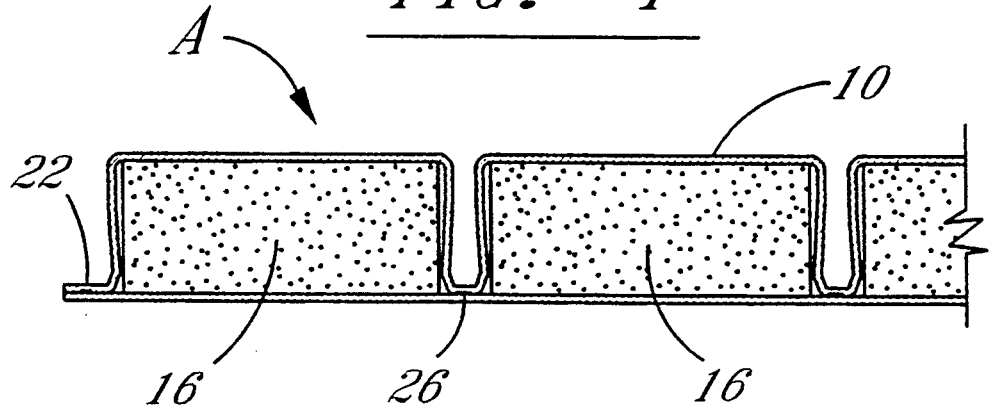
FIG. 2 is a sectional side view of the resilient panel of FIG. 1 taken along lines 2—2.
Figure 5:
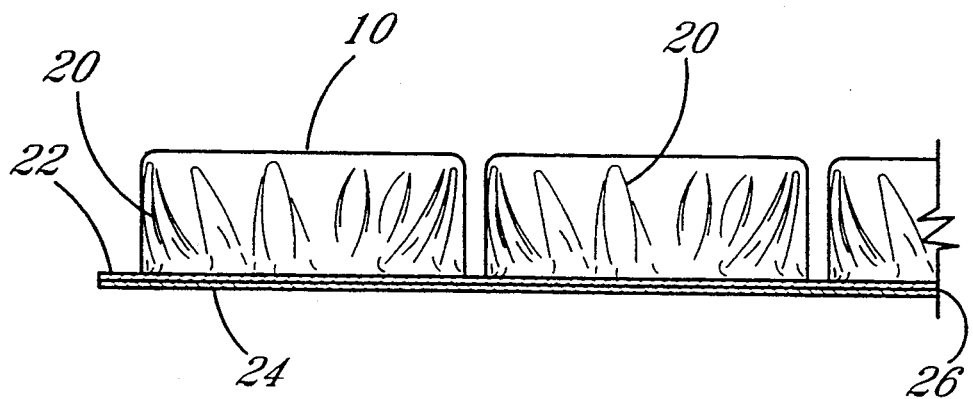
FIG. 5 is a sectional side view of FIG. 1 taken along lines 5—5 showing the folds formed in the covering material.

Referring now to FIG. 1, 2, and 5, elastic pad A is composed of an upper sheet 22 which has been formed into a plurality of equally sized pockets 10 arranged throughout in longitudinal and transverse rows. Pockets 10 are formed by placing sheet 22 over a mold containing a plurality of cavities. Beginning at the center of the mold, the fabric is pressed into the cavities. The remaining cavities are then filled with fabric 26 in an outwardly progressive manner, until the desired area consists of a plurality of pockets 10. A foam element 16 is then inserted into each pocket. Lower fabric 24 is now placed over the elastic foam elements 16 and into contact with parallel edges 26 of pockets 10. Fabric 24 is then united with parallel edges 26 to encapsulate the elastic foam elements in the pockets. Fabric 24 may be attached to fabric 22 by heat sealing, stitching or other suitable means.

Folds 20 are formed in material 22 as it is positioned within the pocket forming molds. These folds 20 represent an excess of fabric which ensures that, when the encapsulated elastic foam elements 16 are deformed during compression they are allowed to deform without restriction. Also, folds 20 further ensure that elastic foam elements rest within pockets 10 in an uncompressed and unreformed condition. This arrangement ensures that each foam element 16 is allowed to retain its entire effective compression range of 0° to 65° of its height. By allowing elastic elements to retain this elastic ability, the maximum of cushioning ability for each foam element 16 is retained. The structure also allows for independent action for each elastic foam element. The condition of adjacent elastic elements does not affect other elastic elements and therefore the hammock effect of cushioning is eliminated. This allows for the selection of precise compression ranges to be arranged in desired patterns over selected areas elastic pad.

Figure 4:
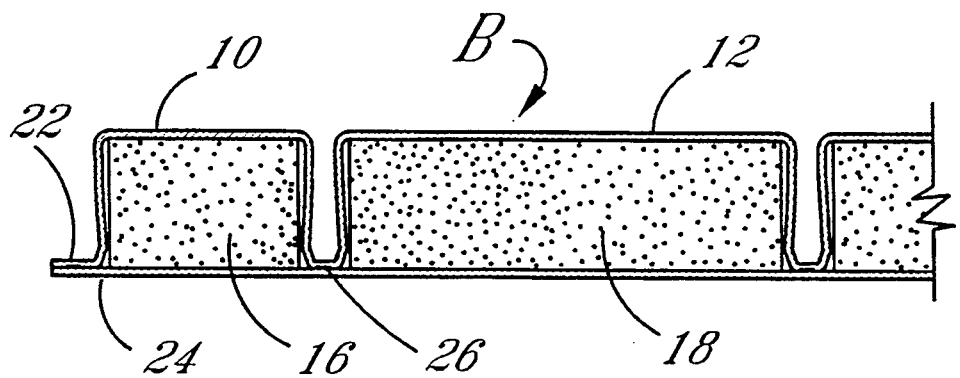
FIG. 4 is a sectional side view of the resilient panel of FIG. 3 taken along lines 4—4.

Turning now to FIGS. 3 and 4, a second embodiment, elastic pad B is shown. Pad B is formed in the same manner as set forth in the description of pad A. With the exception that this pad is designed to have large pockets 12 formed over the central area of the elastic of the pad while the extremities of the pad consist of small pockets 10. Pockets 10 and 12 house elastic foam elements 16 and 18 which are sized to fit freely within the pockets formed in fabric 22. Fabric 28 is secured to edges 26 as in the description of pad A to encapsulate the pads within the pockets.

FIG. 6 shows a third embodiment in which pockets 14 are formed along radial cuts in a sun burst design. The pockets of elastic pad C are also formed in the manner above described. The covering fabric of elastic pads A, B or C may be formed of natural or synthetic yarns. It may be woven or knitted at a desired density. The covering fabric may be substantially inelastic or it may be an elastic fabric.

It is understood that the density of the elastic foam elements 15 and 18 may vary by design. Elastic pads A, B, and C may be formed with selected areas requiring more pressure to compress the elastic foam elements than is required for other areas. For example, pad B may be formed with pockets 12 containing very dense elastic foam elements while pockets 10 contain less dense foam elements.

Alternatively, elastic pad C may be formed with more dense elastic foam elements positioned about he periphery and with less dense elastic elements placed progressively inwardly. It is also possible for the elastic pad to be formed with pockets of varying depths which encapsulate elastic elements of varying thicknesses.

While a preferred embodiment of the invention has been described using specific terms, such description is for illustrative purposes only, and it is to be understood that changes and variations may be made without departing from the spirit or scope of the following claims.

What is claimed is:

1. A resilient panel for use as a body support comprising: a first flexible fabric being conformed to include a plurality of juxtaposed expandable pockets each having folds therein and an open peripheral area defined by edges, said pockets being formed of selected sizes arranged longitudinally and transversely of said panel;

a plurality of resilient foam elements of selected second sizes which substantially conform with said size of said pockets, said resilient foam elements possessing a selected compression range, and each of said resilient elements being arranged within a respective one of said pockets of substantially conforming size, in a free standing and un-compressed condition thereby maintaining the maximum of their elastic capability;

a second flexible fabric secured to said first sheet along said edges to encapsulate said foam elements within said pockets of said resilient panel; whereby said encapsulated resilient foam elements, which are capable of being compressed independently without affecting adjacent foam elements and of being compressed in an unsupported condition, act to expand respective encapsulating pockets upon being compressed.

2. The panel of claim 1 wherein said pockets are of selected configurations and of prescribed depths.

3. The panel of claim 2 wherein said prescribed depth is variable and said selected configuration is uniform.

4. The panel of claim 2 wherein said depth is uniform and said selected configuration between pockets is uniform.

5. The panel of claim 1 wherein said selected compression range is uniform between said resilient elements.

6. The panel of claim 1 wherein said selected compression range varies between said resilient elements.

7. The panel of claim 6 wherein said resilient elements of variable compression ranges are arranged in said panel according to a selected pattern.

8. The panel of claim 7 wherein an interior portion of said panel contain resilient elements which are more compression resistant than these resilient elements arranged along an exterior portion of said panel.

9. The panel of claim 1 wherein said selected sizes of said resilient elements are uniform.

10. The panel of claim 1 wherein said selected sizes of said resilient elements are variable.

11. The panel of claim 10 wherein certain of said resilient elements are of larger size that the remainder of said resilient elements, and said larger size resilient element have a greater density and thus a greater resistance to compression than other of said resilient elements.

12. The panel of claim 11 wherein the interior portion of said panel contains said larger size resilient elements.

13. The panel of claim 1 wherein said pockets are arranged diagonally transversely and longitudinally of said panel.

14. The panel of claim 1 wherein said first and second fabrics are formed of one of knitted and woven yarns formed of natural fibers.

15. The panel of claim 1 wherein said first and second fabrics are formed of synthetic material.

16. The panel of claim 1 wherein said first and second fabrics are joined by one of bonding and stitching.

17. The panel of claim 1 wherein said edges are arranged along substantially a single plane.

18. A resilient panel comprising:

a first fabric having a plurality of expandable pockets formed therein said pockets being formed with folds which allow expansion thereof;

each of said pockets containing a free standing, resilient foam element having a compression range, each of said resilient foam element being sized to substantially conform with the size and shape of the respective pocket within which it is located while said foam element is in an un-compressed condition;

a second fabric arranged over and attached to said first sheet to encapsulate said foam elements within said pockets in an independent, free standing and uncompressed condition; whereby said panel possess a compression potential equal the maximum of the compression range of said resilient foam elements.

19. The panel of claim 18 wherein said compression range between said resilient foam elements varies and said resilient elements are arranged throughout said panel in a selected pattern determined by selection between compression ranges.

20. The panel of claim 18 wherein the density of said resilient foam elements of the resilient panel is uniform.

21. The panel of claim 18 wherein said resilient panel is formed with said resilient foam elements formed with variable densities.

22. The panel of claim 18 wherein said pockets are formed of inelastic material.

23. The panel of claim 18 wherein said pockets are formed of elastic material.

* * * * *